United States Patent
Ainspan et al.

(10) Patent No.: US 10,983,192 B2
(45) Date of Patent: *Apr. 20, 2021

(54) SCALABLE POLARIMETRIC PHASED ARRAY TRANSCEIVER

(71) Applicant: INTERNATIONAL BUSINESS MACHINES CORPORATION, Armonk, NY (US)

(72) Inventors: Herschel A. Ainspan, New Hempstead, NY (US); Mark Ferriss, Tarrytown, NY (US); Arun S. Natarajan, White Plains, NY (US); Benjamin D. Parker, Peekskill, NY (US); Jean-Oliver Plouchart, New York, NY (US); Scott K. Reynolds, Amawalk, NY (US); Mihai A. Sanduleanu, Yorktown Heights, NY (US); Alberto Valdes Garcia, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,861

(22) Filed: Jul. 16, 2019

(65) Prior Publication Data

US 2021/0011116 A1    Jan. 14, 2021

Related U.S. Application Data

(63) Continuation of application No. 14/837,671, filed on Aug. 27, 2015, now Pat. No. 10,416,283, which is a
(Continued)

(51) Int. Cl.
*G01S 7/02* (2006.01)
*H04B 1/48* (2006.01)
(Continued)

(52) U.S. Cl.
CPC ............... *G01S 7/024* (2013.01); *H01Q 3/28* (2013.01); *H01Q 3/36* (2013.01); *H04B 1/48* (2013.01)

(58) Field of Classification Search
CPC . G01S 7/024; H01Q 3/28; H01Q 3/36; H04B 1/48
See application file for complete search history.

(56) References Cited

U.S. PATENT DOCUMENTS

| | | |
|---|---|---|
| 7,272,408 B2 | 9/2007 | Dalal et al. |
| 7,538,735 B2 | 5/2009 | Crouch |

(Continued)

FOREIGN PATENT DOCUMENTS

| | | |
|---|---|---|
| CN | 201637845 U | 11/2010 |
| CN | 102331575 A | 1/2012 |
| WO | 2012033509 A1 | 3/2012 |

OTHER PUBLICATIONS

Krnan, L., et al. "Reconfigurable Digitally Scanned Polarimetric L-Band Radar" 2009 IEEE—Radar Conference. May 2009. (4 Pages).

(Continued)

*Primary Examiner* — Timothy A Brainard
(74) *Attorney, Agent, or Firm* — Tutunjian & Bitetto, P.C.; Jeffrey S. LaBaw

(57) ABSTRACT

Polarimetric transceiver front-ends and polarimetric phased array transceivers include two receive paths configured to receive signals from an antenna, each including a respective variable phase shifter. A first transmit path is connected to the variable phase shifter of one of the two receive paths and is configured to send signals to the antenna. A transmit/receive switch is configured to select between the first transmit path and the two receive paths for signals. The transmit/receive switch has an element that adds a high (Continued)

impedance to the transmit path when the transmit/receive switch is in a receiving state.

20 Claims, 8 Drawing Sheets

Related U.S. Application Data continuation of application No. 13/904,142, filed on May 29, 2013, now Pat. No. 9,191,057.

(60) Provisional application No. 61/746,646, filed on Dec. 28, 2012.

(51) Int. Cl.
*H01Q 3/36* (2006.01)
*H01Q 3/28* (2006.01)

(56) References Cited

U.S. PATENT DOCUMENTS

| | | | |
|---|---|---|---|
| 8,619,671 B2 | 12/2013 | Kwon et al. | |
| 9,191,057 B2* | 11/2015 | Ainspan | H01Q 3/36 |
| 10,416,283 B2* | 9/2019 | Ainspan | H04B 1/48 |
| 2004/0259505 A1* | 12/2004 | Vasanth | H04B 1/48 |
| | | | 455/78 |
| 2011/0063169 A1 | 3/2011 | Chen et al. | |
| 2013/0069831 A1 | 3/2013 | Friedman et al. | |

OTHER PUBLICATIONS

Schulwitz, L., et al. "A Compact Dual-Polarized Multibeam Phased-Array Architecture for Millimeter-Wave Radar" IEEE Transactions on Microwave Theory and Techniques, vol. 53, No. 11. Nov. 2005. pp. 3588-3594.

* cited by examiner

SCALABLE POLARIMETRIC PHASED ARRAY TRANSCEIVER

GOVERNMENT RIGHTS

This invention was made with Government support under Contract No. HR0011-11-C-0136 awarded by Department of Defense (DOD). The Government has certain rights in this invention.

BACKGROUND

Technical Field

The present invention relates to millimeter-wave transmitters and receivers and, more particularly, to polarimetric phased array millimeter-wave transceivers.

Description of the Related Art

Millimeter-wave (mmWave) communications provide large bandwidth, short wavelengths, and the ability to operate in dusty and foggy conditions. As a result, mmWave systems are attractive for high data rate communications and high-resolution imaging applications. These features can be further bolstered by the use of dual-polarization communications, which are advantageous in to imaging systems with degraded visibility.

Current integrated phased array systems do not support dual-polarization communications, are not flexible enough to support multiple applications, and are not scalable to large numbers of elements. Non-integrated solutions for using dual-polarization communication in mmWave systems are based on discrete electrical and mechanical modules and add significant weight and size.

SUMMARY

A polarimetric transceiver front-end includes two receive paths configured to receive signals from an antenna, each including a respective variable phase shifter. A first transmit path is connected to the variable phase shifter of one of the two receive paths and is configured to send signals to the antenna. A transmit/receive switch is configured to select between the first transmit path and the two receive paths for signals. The transmit/receive switch has an element that adds a high impedance to the transmit path when the transmit/receive switch is in a receiving state.

A polarimetric phased array transceiver includes front-ends configured to transmit and receive signals. Each front-end includes two receive paths configured to receive signals, a first transmit path configured to send signals to the antenna, and a transmit/receive switch configured to select between the first transmit path and the two receive paths for signals. Each transmit/receive switch includes an element that adds a high impedance to the transmit path when the transmit/receive switch is in a receiving state. A first power combiner is configured to combine the received signals from a first receive path of the two receive paths of each of the plurality of front ends. A second power combiner is configured to combine the received signals from a second receive path of the two receive paths of each of the plurality of front ends and further is configured to split a transmission signal to the transmit path of each of the plurality of front ends.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Embodiments of the present invention provide millimeter-wave (mmWave) phased array transceivers, where each element in the array allows for simultaneous reception in two polarizations. A transmitter portion of the transceiver is capable of transmitting on each polarization in alternation using a dual-polarized antenna. Thus each front-end has two independent receiving (RX) paths and a transmission (TX) path with two outputs. A switch changes between RX and TX modes. Whereas a traditional switch would have a significant impact on performance, since the insertion loss directly degrades the RX noise figure, the switch described herein minimizes the impact on the noise figure.

Figure 1:
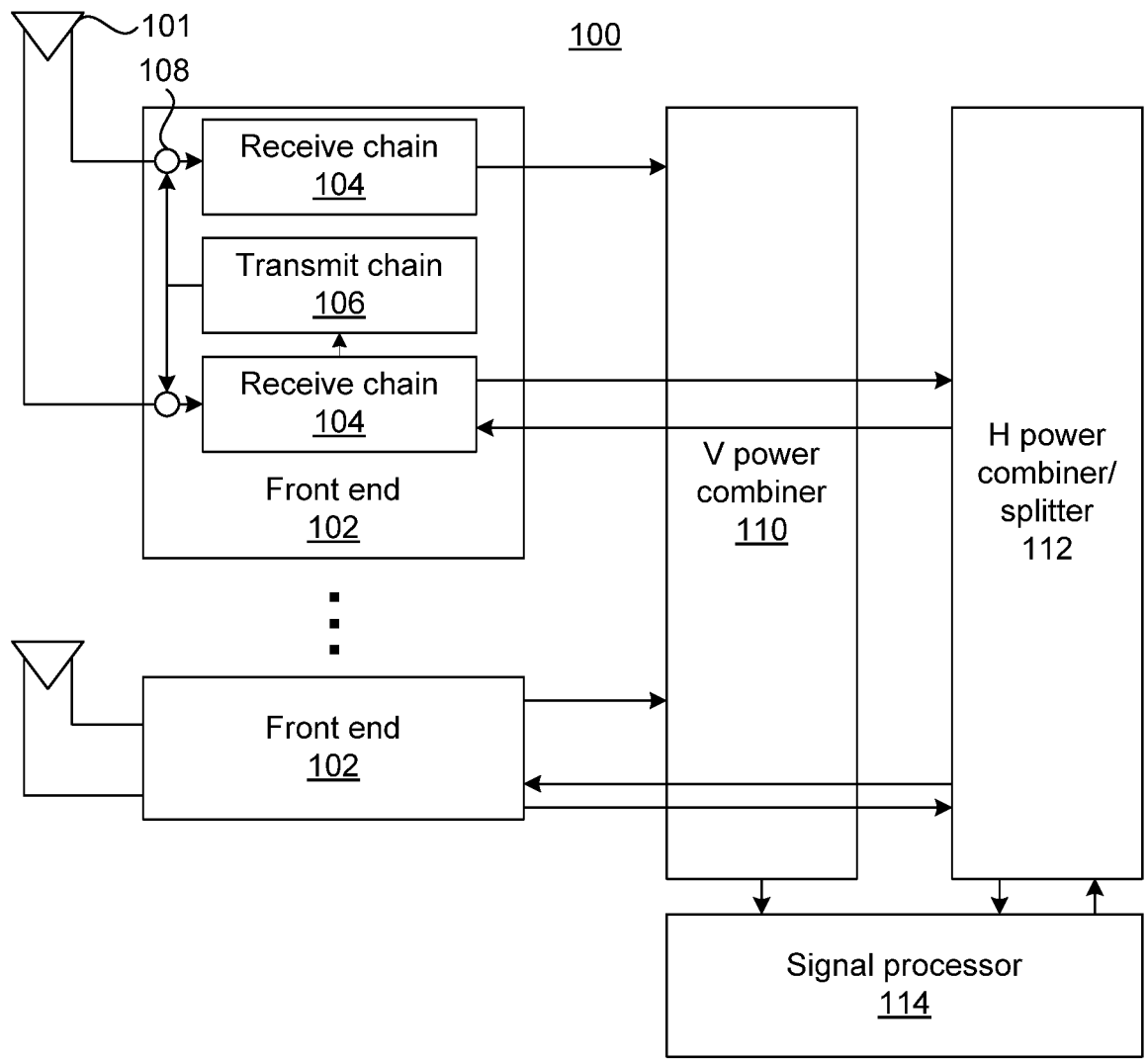
FIG. 1 is a block diagram of a polarimetric phased array transceiver in accordance with the present principles.

Referring now to the drawings in which like numerals represent the same or similar elements and initially to FIG. 1, a general diagram of a dual-polarization phased array transceiver 100 is shown. The transceiver 100 includes multiple dual-polarization front ends 102, each having an associated antenna 101 capable of transmitting and receiving on two different polarizations. To accomplish this, the antenna 101 may include multiple physical receiving/transmitting elements that are configured to receive/transmit their respective polarizations. One specific design for an exemplary antenna 101 may be a dual-polarized patch antenna. For ease of description, the embodiments set forth herein will be described as transmitting on a horizontal (H) and a vertical (V) polarization, though it should be recognized that any suitable polarization, including left-handed and right-handed polarizations, can be used instead.

Each front end 102 includes two receive chains 104 and a transmit chain 106. When the transceiver 100 receives signals, the antennas 101 produce respective received polarized signals that arrive at front end 102. Each signal passes through a respective H or V transmit/receive switch 108 before arriving at receive chain 104. The receive chains 104 performs amplification and phase shifting of the received signal, as will be described in greater detail below. In this manner, the front ends 102 may perform beam steering to selectively receive signals arriving from a particular direction.

The V receive chain 104 of each front end 102 provides its output to a V power combiner 110 that combines the signals from each of the various front ends 102 along the vertical polarization into a single received signal. Similarly, the H receive chain 104 of each front end 102 provides its output to the H power combiner/splitter, which combines all received H-polarized signals. The two power combiners 110 and 112 output their respective combined signals to signal processor 114, which transforms the received signals into an appropriate encoding and frequency for subsequent use.

During transmission, the signal paths are reversed. A transmission signal is provided by signal processor 114 to H power combiner/splitter 112. In the present embodiments only one transmission signal is employed. Those having ordinary skill in the art will recognize that the transmission signal may be equivalently provided along the H or V signal paths. In the present case, the H power combiner/splitter 112 receives the transmission signal and distributes it to each of the front ends 102. Additionally, although the depicted embodiments show only a single transmission chain 106, the present principles may also be applied to embodiments having two complete transmission chains that can transmit simultaneously in respective polarizations.

The transmitted signal branches from the receive chain 104 to transmit chain 106, where it is amplified and sent to the antenna 101 by way of one or both of the transmit/receive switches 108. It should be recognized that switches 108 may be configured to selectively transmit signals along a single polarization or along both polarizations.

In one specific embodiment, the transceiver 100 may have 16 radio-frequency phase shifting front ends 102. Alternatively, this may be conceived of as 32 distinct receive chains 104, grouped into two sets of 16 elements—one for each antenna polarization.

Figure 2:
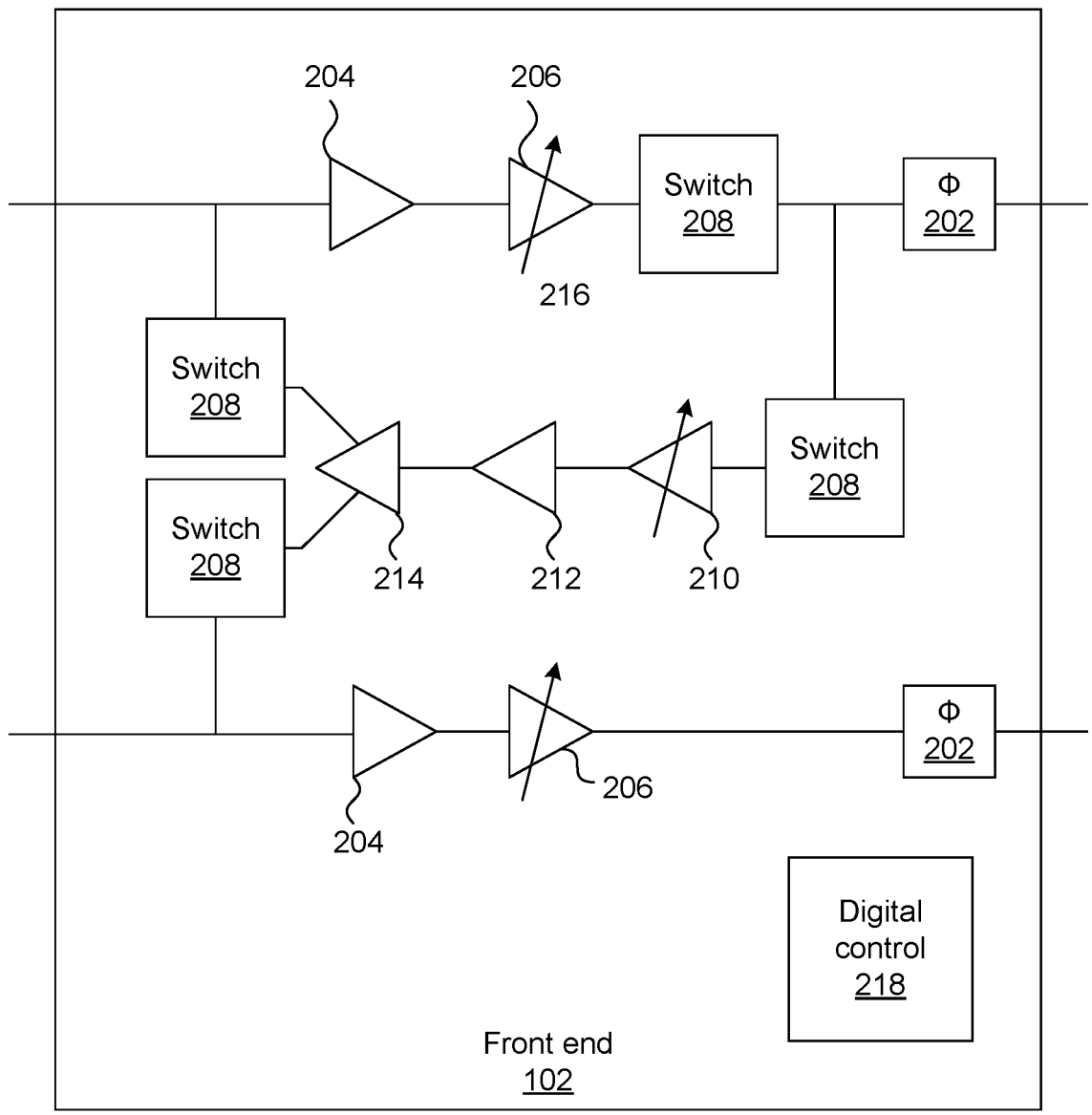
FIG. 2 is a block diagram of a polarimetric phased array front-end in accordance with the present principles.

Referring now to FIG. 2, a detailed view of a front ends 102 is shown. As noted above, the front end 102 has two receive paths 104 and one transmit path 106. The receive paths amplify the received polarized signals with low-noise amplifiers 204 and variable amplifiers 206 according to beam steering parameters. The receive paths then phase shift the amplified signals at variable phase shifters 202 according to beam steering parameters. The front end 102 may provide digital control of the variable amplifiers 206 and the variable phase shifters 202 according to locally stored parameters or based on signals received from an external control module. The phase shifters 202 may be passive, bi-directional, reflection-type phase shifters with an exemplary phase range of 180 degrees. Sharing the phase shifters 202 between the transmit and receive paths saves a substantial amount of area.

As described above, one of the receive paths 104 splits off into transmit path 106. Two switches 208 govern whether the phase shifter 202 is used to transmit or receive at a given time. Two additional switches 208 at the output of the transmission path determine which polarization is used to transmit a signal.

The transmission path 106 receives a signal from the variable phase shifter 202 of one of the receive paths 104 by way of a switch 208. The transmission path includes a variable amplifier 210 and a 212 that function similarly to those in the receive path. The amplified signal is passed to an active power splitter 214 that generates two transmit signals, one along each polarization. It should be noted that the variable amplifiers may also serve the function of a phase inverter. Each path needs 360 degrees of beam steering range, so if phase shifter 202 provides 180 degrees, another discrete step of 180 degrees is needed. In the present embodiments, this discrete step may be provided by the variable amplifiers 206 and 210.

The phase shifter 202, the amplifiers 206 and 210, and the switches 208 may be controlled digitally by the front end 102. Each operating characteristic (e.g., transmission, reception, polarization, phase shift, gain) is defined by a set of digital controls 218. As will be described in greater detail below, a memory and logic unit may be included in the front end 102 to provide agile switching between different modes of operation. Pre-defined sets of control bits are stored and then applied to the circuitry as required by the overall system.

Figure 3:
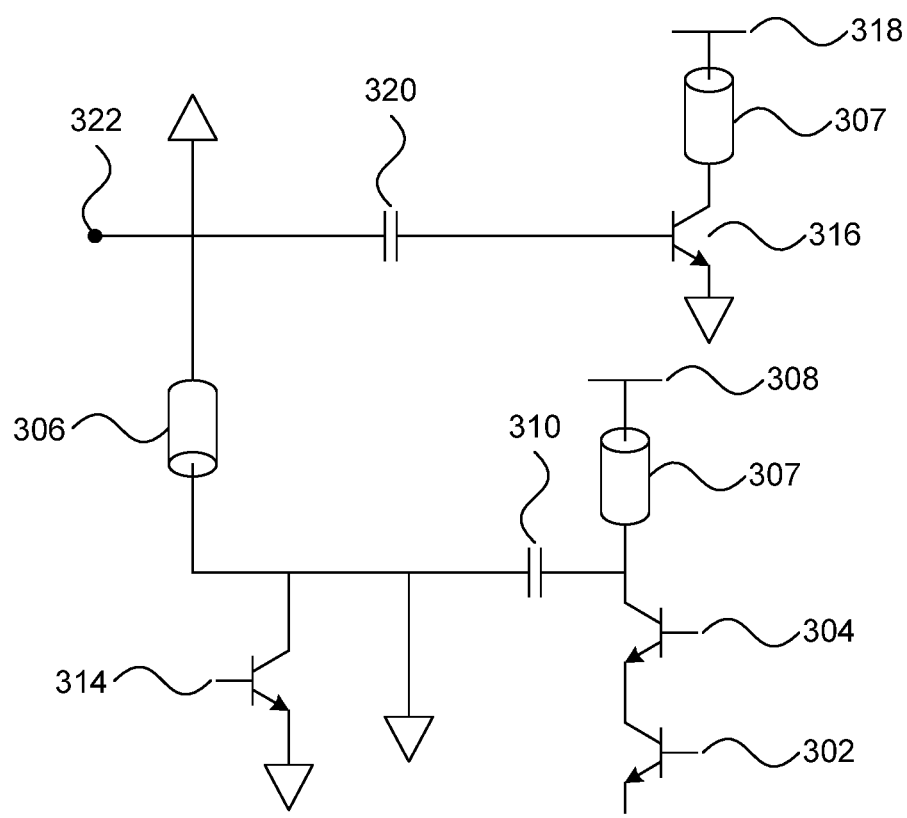
FIG. 3 is a schematic of a low-noise transmit/receive switch in accordance with the present principles.

Referring now to FIG. 3, greater detail is provided on the region of the front end 102 that connects the output of amplifier 214 in the transmit path 106, the input to amplifier 204 in the receive paths 104, and the antenna 101. Switching is activated by transistor 314. When the switch 314 is off, the linear amplifier input 316 (drawing power from a power source 318 via a transmission line 307) is also turned off and the transmit path input 302 is active. It should be noted that the transmit path input 302 will be shared between two switches 208, allowing the transmit path input 302 to be fed to either of the two output polarizations. A switch control 304 turns the transmission of input 302 on and off, with a power source 308 connected via a transmission line 307, allowing the transmission output polarization to be controlled. In the present embodiments, the transmit path input 302 receives one output of active power splitter 214. In this configuration, the input from the transmit path maximizes the power delivered to the antenna 101 at output 322. A DC biasing input 302 is also provided.

In receiving mode, the switch 314 is on, presenting a low impedance to ground on the transmit path 106. A quarter-wavelength transmission line 306 transforms the short load of the switch 314 such that the transmit path 106, as seen from the receive path 104 at the received wavelength, presents a high impedance. Input matching from the low noise amplifier 204 in the receive path 104 is configured to attain the lowest possible noise factor when active and presents the highest impedance possible when inactive. A bypass capacitor 320 has a low series impedance at the target receiving frequency.

In transmission mode, the switch 314 is off. Signals from the transmit path input pass through a bypass capacitor 310 having a low series impedance at the transmission frequency. The transmission signals proceed to the antenna output 322 by a path common to the receiving path 104.

Figure 4:
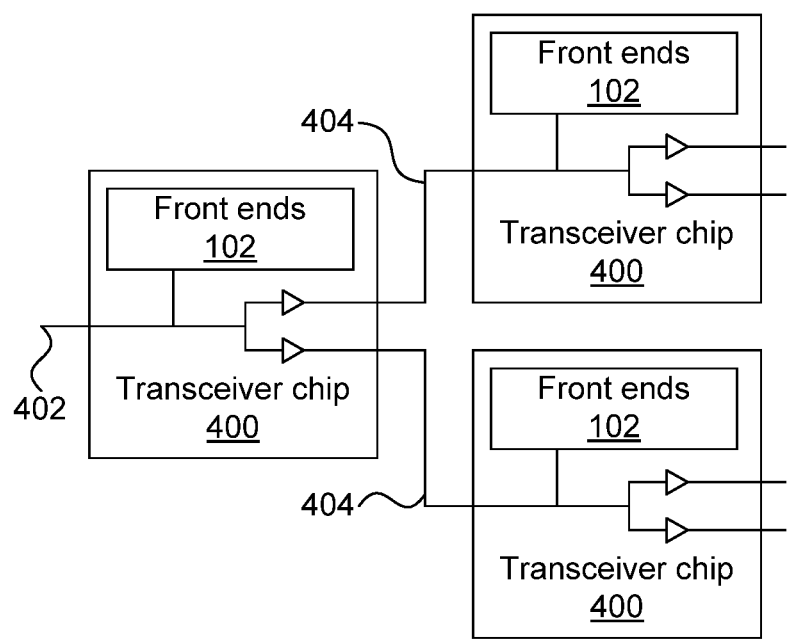
FIG. 4 is a block diagram of signal distribution between a set of polarimetric phased array transceivers in accordance with the present principles.

Referring now to FIG. 4, signal distribution for a local oscillator (LO) signal is shown. To make phased array transceiver chips 400 suitable for use in larger, scalable arrays, LO signals from different chips 400 need to be distributed or combined in a coherent fashion. Toward this end, on-chip buffers for a given transceiver chip distribute an incoming LO signal 402 to two different outputs 404. The outputs may then, in turn, be connected to a next level in an array hierarchy of chips 400. The chips 400 use the LO signal as a reference and may modify the LO signal according to the signal frequencies needed.

Figure 5:
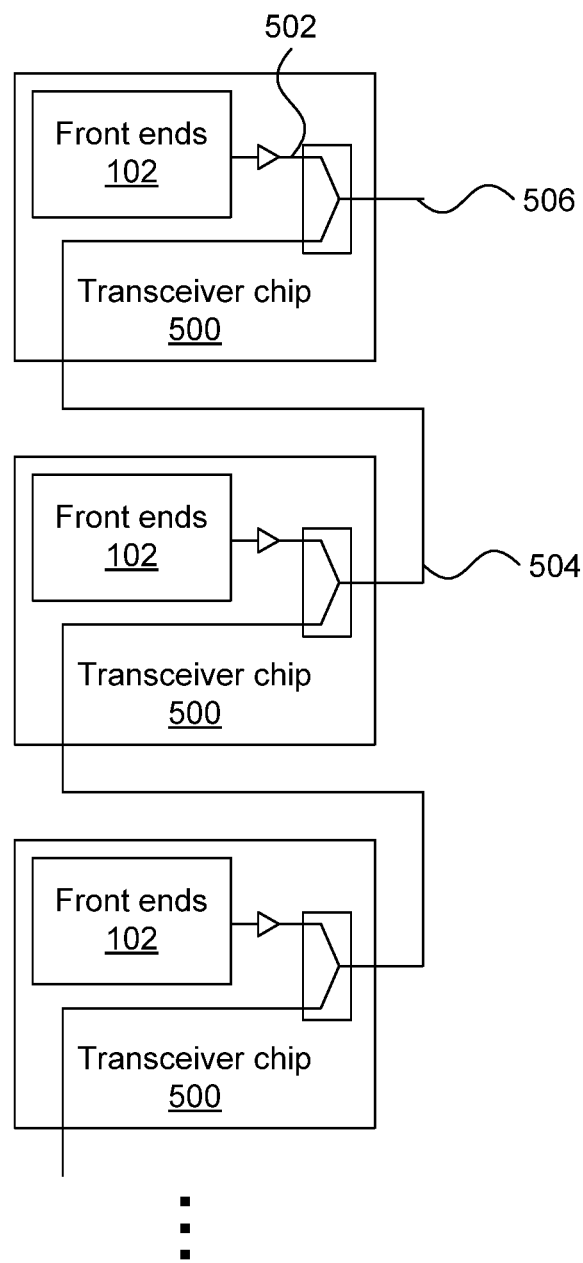
FIG. 5 is a block diagram of received signal combination from a set of polarimetric phased array transceivers in accordance with the present principles.

Referring now to FIG. 5, signal combination for an intermediate frequency (IF) signal having a received signal is shown. A set of transceiver chips 500 are connected linearly, with each chip 500 adding its received signal 502 from front ends 102 to an output 504 of the previous chip(s) 500 to form a combined output 506. A similar structure for signal distribution may be used for transmission signals. In this manner, arbitrarily large numbers of chips may be connected to form a large-scale array. It should be recognized that increasing the number of chips will increase an amount of phase delay between each respective chip. However, the phase shifter 202 at each front end 102 compensates for this phase delay when providing beam steering parameters.

Figure 6:
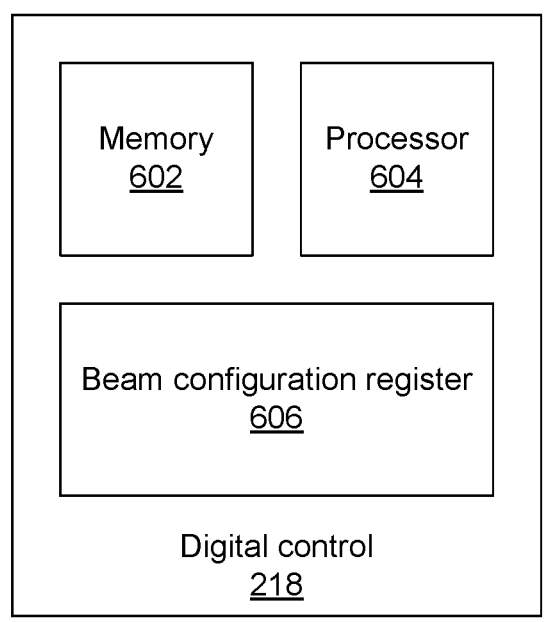
FIG. 6 is a block diagram of a digital control for polarimetric phased array front-ends in accordance with the present principles.

Referring now to FIG. 6, a diagram of digital control 218 is shown. Steering the beam, or switching between transmission and reception, involves changing the digital signals being provided to the phase shifter 202, the variable amplifiers 206 and 212, and to the switches 216. In one exemplary embodiment, a 24-bit digital word controls all of the parameters of a given front end 102, with 16 such front-ends 102 being on a single chip 100. Although it is possible to load these control words across all of the (potentially thousands of) chips, such loading could take a substantial amount of time and slow the responsiveness of the system.

To address this issue, all of the possible beam configurations and corresponding parameters may be stored on-chip in a memory 602 of digital control 218. A central, off-chip control may then issue a command to each of the chips 100 that includes only a pointer to a location in a beam configuration register 606 stored in memory 602 that corresponds with the configuration for that chip 100. The digital control 218 receives this instruction and processor 604 finds the appropriate configuration parameters, applying them to the respective devices on the chip 100. In this exemplary embodiment, with 32 beam directions stored in the register 606 and about two thousand different register entries, one megabyte of storage or more may be needed to store all of the pertinent beam parameters.

Digital control of the chips 100 may be implemented in parallel, with each chip 100 being sent a signal along an individual communication line, in serial, with each chip's instructions being sent along a serial link of chips 100, or in a hierarchically distributed fashion. For example, each chip 100 may receive instructions and distribute them to a set of other chips 100, farther down on the hierarchy. This repeats until all chips 100 have received the appropriate beamforming instructions.

Figure 7:
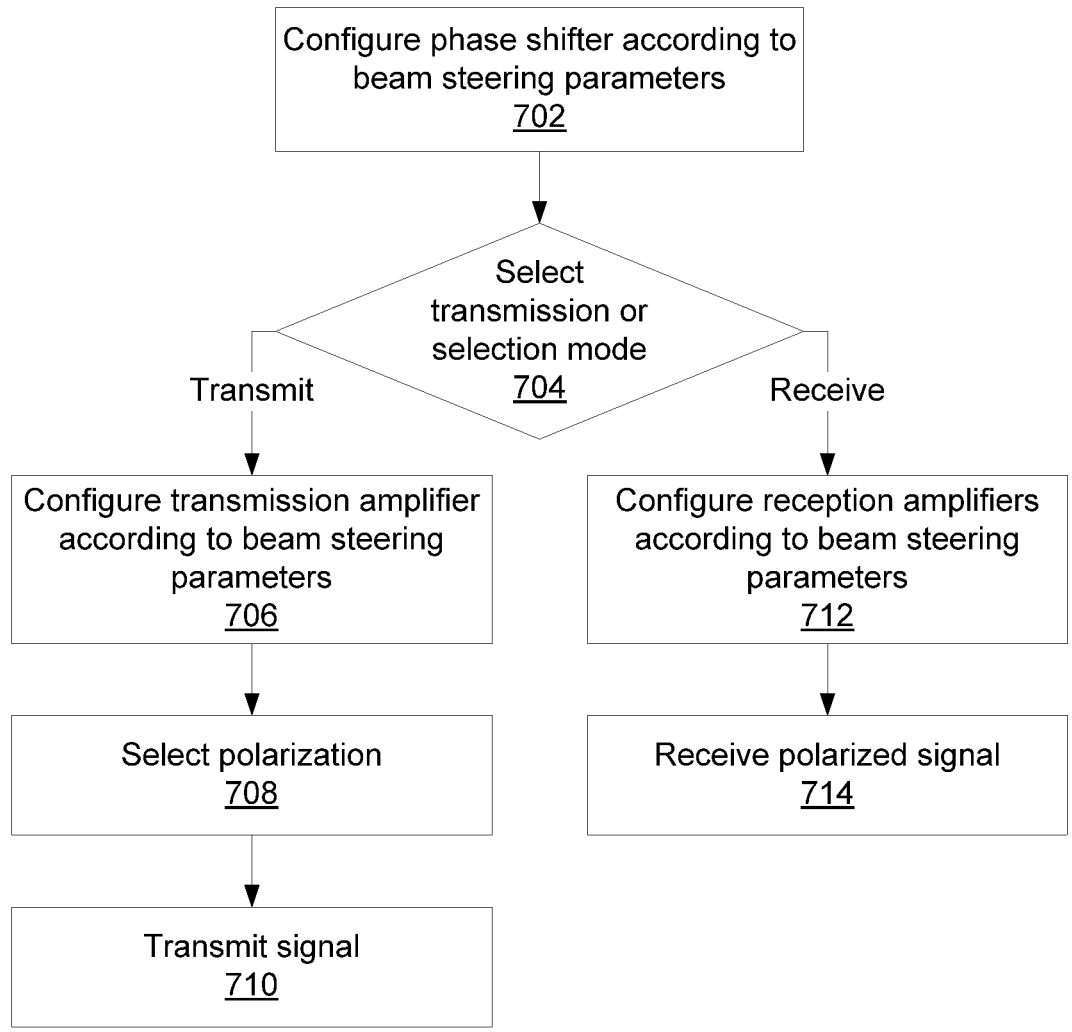
FIG. 7 is a block/flow diagram of a method of using a polarimetric phased array transceiver in accordance with the present principles.

Referring now to FIG. 7, a method for controlling a dual-polarization phased array transceiver is provided. As noted above, control may be performed at a central location or may be distributed. Block 702 configures the phase shifters of each front-end according to beam steering parameters. These parameters generally include a phase shift for each front end 102 in each chip 100 and provide a delay between successive signals, such that the gain of the array is enhanced in a particular direction.

Block 704 selects a transmission or reception mode for the array. As described above, this selection involves the setting of switches 216 to cause signals to path through the reception paths 104 or the transmission path 106. If the transmit mode is selected, block 706 configures the transmission amplifier 210 according to the beam steering parameters. Block 708 selects a polarization for transmission using switches 216. The present embodiments select only one polarization for transmission, while allowing receipt of signals on both polarizations. Block 710 then transmits the signal from the front ends 102 using the appropriate beam steering. If receive mode is selected, block 712 configures reception amplifiers 206 according to the beam steering parameters. Block 714 then receives signals along both polarizations, using two distinct receive paths 104 to process the signals.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 8:
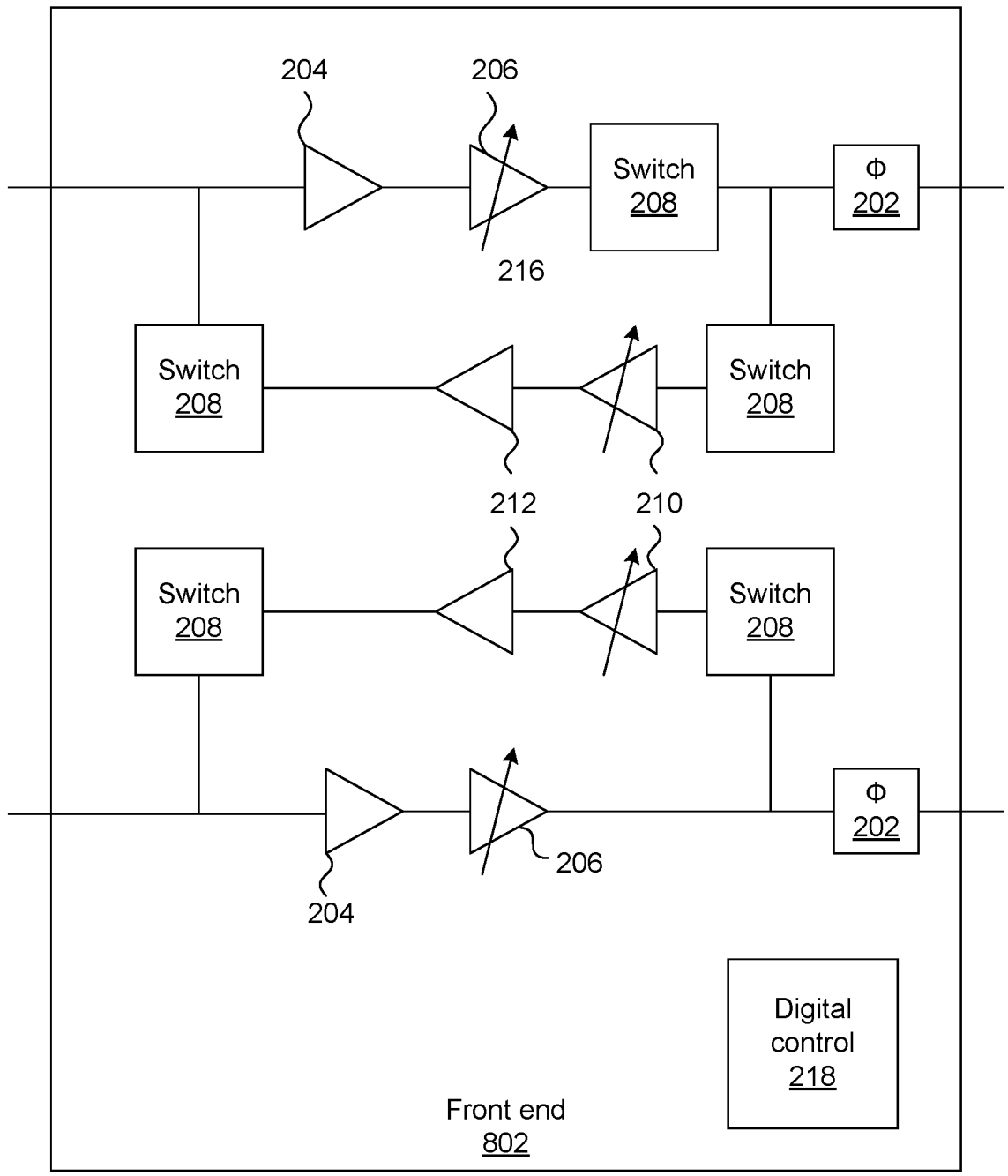
FIG. 8 is a block diagram of an alternative embodiment for a polarimetric phased array front end in accordance with the present principles.
Figure 9:
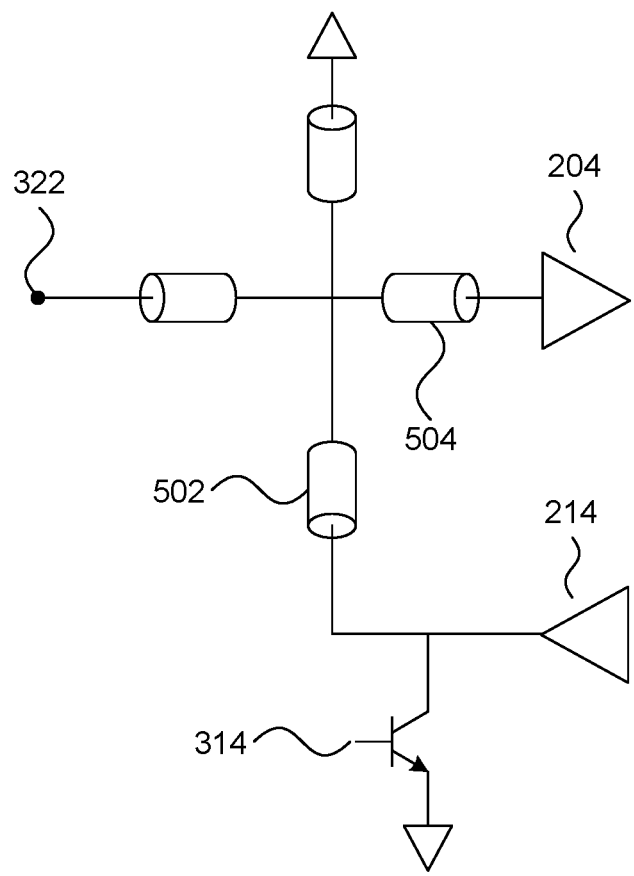
FIG. 9 is a schematic of a simplified low-noise transmit/receive switch in accordance with the present principles.

Referring now to FIG. 8, an alternative front end 802 is shown that has two separate transmission paths 106. This embodiment is similar to that set forth in FIG. 2, but differs in that both paths include a transmission path for the respective polarization. Because each path now has a dedicated polarization, the splitter 214 is not included. Referring now to FIG. 9, a generic form of a switch 208 is shown. A transistor 314 governs whether the switch 208 operates in a transmission mode or a reception mode. In transmission mode, the switch 314 is open and a transmission input from amplifier 214 travels past a transmission line 502 that has low impedance at the transmission frequency to the antenna output at 322. A second transmission line 504 has a length selected to minimize noise. In reception mode, the switch 314 is closed. The transmission line 306 has a high impedance at the reception frequency, such that received signals pass to a reception amplifier 204.

Having described preferred embodiments of a scalable polarimetric phased array transceiver and method of using the same (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A polarimetric transceiver front-end comprising:
   two receive paths configured to receive signals from an antenna, each including a respective variable phase shifter;
   a first transmit path that is connected to the variable phase shifter of one of the two receive paths, configured to send signals to the antenna; and
   a transmit/receive switch configured to select between the first transmit path and the two receive paths for signals, the transmit/receive switch comprising an element that adds a high impedance to the transmit path when the transmit/receive switch is in a receiving state.

2. The polarimetric transceiver front-end of claim 1, further comprising a transmission polarization switch configured to select a polarization for transmission.

3. The polarimetric transceiver front-end of claim 2, wherein the transmission polarization switch connects to the transmit/receive switch.

4. The polarimetric transceiver front-end of claim 1, wherein each receive path corresponds to a respective polarization and further comprises a variable amplifier.

5. The polarimetric transceiver front-end of claim 4, wherein the transmit path comprises a transmit variable amplifier.

6. The polarimetric transceiver front-end of claim 5, further comprising a digital control configured to provide settings to the variable phase shifters, the variable amplifiers, and the transmit/receive switch.

7. The polarimetric transceiver front-end of claim 1, further comprising a second transmit path configured to send signals to the antenna, said transmit path being connected to the variable phase shifter of the receive path not connected to the first transmission path, said transmit path comprising a transmit variable amplifier.

8. The polarimetric transceiver front-end of claim 7, wherein the first and second transmit paths correspond to respective orthogonal transmission polarizations.

9. A polarimetric phased array transceiver, comprising:
a plurality of front-ends configured to transmit and receive signals, each front end comprising:
two receive paths configured to receive signals;
a first transmit path configured to send signals to the antenna; and
a transmit/receive switch configured to select between the first transmit path and the two receive paths for signals, the transmit/receive switch comprising an element that adds a high impedance to the transmit path when the transmit/receive switch is in a receiving state;
a first power combiner configured to combine the received signals from a first receive path of the two receive paths of each of the plurality of front ends; and
a second power combiner configured to combine the received signals from a second receive path of the two receive paths of each of the plurality of front ends and further configured to split a transmission signal to the transmit path of each of the plurality of front ends.

10. The polarimetric phased array transceiver of claim 9, further comprising a plurality of dual polarization antennas, each antenna associated with a respective front-end.

11. The polarimetric phased array transceiver of claim 9, further comprising a transmission polarization switch configured to select a polarization for transmission.

12. The polarimetric phased array transceiver of claim 11, wherein the transmission polarization switching mechanism connects to the transmit/receive switch.

13. The polarimetric phased array transceiver of claim 9, further comprising a digital control configured to provide settings to the transmit/receive switch of each front end.

14. The polarimetric phased array transceiver of claim 13, wherein the digital control comprises a beam configuration register that stores values for each of said settings that correspond to predetermined beam directions.

15. The polarimetric phased array transceiver of claim 9, wherein the two receive paths each correspond to a respective polarization and each comprise a variable amplifer and a variable phase shifter.

16. The polarimetric phased array transceiver of claim 15, wherein the transmit path is connected to the variable phase shifter of one of said two receive paths and comprises a transmit variable amplifier.

17. The polarimetric phased array transceiver of claim 16, wherein each front end further comprises a second transmit path configured to send signals to the respective antenna, said transmit path being connected to the variable phase shifter of the receive path not connected to the first transmission path, said transmit path comprising a second variable amplifier.

18. The polarimetric phased array transceiver of claim 17, wherein the first and second transmit paths correspond to respective orthogonal transmission polarizations.

19. The polarimetric phased array transceiver of claim 9, further comprising a signal distribution network configured to accept a local oscillator signal input and to retransmit the local oscillator signal to one or more other polarimetric phased array transceivers.

20. The polarimetric phased array transceiver of claim 9, further comprising a signal distribution network configured to accept combined signals from the power combiners and to combine said combined signals with respective signals from one or more other polarimetric phased array transceivers.

* * * * *